US011893503B2

(12) United States Patent
Misra et al.

(10) Patent No.: US 11,893,503 B2
(45) Date of Patent: Feb. 6, 2024

(54) MACHINE LEARNING BASED SEMANTIC STRUCTURAL HOLE IDENTIFICATION

(71) Applicant: ACCENTURE GLOBAL SOLUTIONS LIMITED, Dublin (IE)

(72) Inventors: Janardan Misra, Bangalore (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1157 days.

(21) Appl. No.: 16/594,899

(22) Filed: Oct. 7, 2019

(65) Prior Publication Data

US 2021/0103854 A1    Apr. 8, 2021

(51) Int. Cl.
*G06N 5/022*    (2023.01)
*G06F 40/30*    (2020.01)
*G06N 5/04*    (2023.01)

(52) U.S. Cl.
CPC ............. *G06N 5/022* (2013.01); *G06F 40/30* (2020.01); *G06N 5/042* (2013.01)

(58) Field of Classification Search
CPC ........... G06N 5/022; G06N 5/30; G06N 5/042
See application file for complete search history.

(56) References Cited

U.S. PATENT DOCUMENTS 8,805,845 B1    8/2014  Li et al.
2019/0384737 A1* 12/2019  Schardt ................... G06F 9/541

FOREIGN PATENT DOCUMENTS

CN    110188817 A    8/2019

OTHER PUBLICATIONS

Author—Stephen W. Raudenbush, Leon Gleser, Larry Hedges, Eugene G. Johnson, Eva Petkova Title—Comparing Regression Coefficients Between Models: Concepts and Illustrative Examples Publisher—Institute of Education Sciences National Center for Education Statistics Date Published—1997 (Year: 1997).*
Author—M. Kashif Gill, 1,2 Tirusew Asefa,3 Yasir Kaheil,1 and Mac McKee Title-Effect of missing data on performance of learning algorithms for hydrologic predictions: implications to an imputation techniqu Publisher—Water Resources Research Date Published—Mar. 31, 2007 (Year: 2007).*

(Continued)

*Primary Examiner* — Brian M Smith
(74) *Attorney, Agent, or Firm* — Mannava & Kang, P.C.

(57) ABSTRACT

In some examples, machine learning based semantic structural hole identification may include mapping each text element of a plurality of text elements of a corpus into an embedding space that includes embeddings that are represented as vectors. A semantic network may be generated based on semantic relatedness between each pair of vectors. A boundary enclosure of the embedding space may be determined, and points to fill the boundary enclosure may be generated. Based on an analysis of voidness for each point within the boundary enclosure, a set of void points and void regions may be identified. Semantic holes may be identified for each void region, and utilized to determine semantic porosity of the corpus. A performance impact may be determined between utilization of the corpus to generate an application by using the text elements without filling the semantic holes and the text elements with the semantic holes filled.

18 Claims, 13 Drawing Sheets

(56) References Cited

OTHER PUBLICATIONS

Author—Xiaojin Zhu Title—Persistent Homology: An Introduction and a New Text Representation for Natural Language Processing Publisher—Department of Computer Sciences, University of Wisconsin-Madison Date Published—Aug. 2013 (Year: 2013).*

Author—Veselin Raychev, Martin Vechev, Eran Yahav Title—Code Completion with Statistical Language Models Publisher—Association for Computing Machinery Date Published—Jun. 9, 2014 (Year: 2014).*

Chandrahas et al., "Towards understanding the geometry of knowledge graph embeddings," Proc. of the 56th Annual Meeting of the Assn. for Computational Linguistics (Jul. 2018) 10 pp. (Year: 2018).*

Liu, H. et al., "Analogical inference for multi-relational embeddings," Intl. Conf. on Machine Learning (2017) 11 pp. (Year: 2017).*

Agumya, A. et al., "Assessing 'Fitness for Use' of geographic information: what risk are we prepared to accept in our decisions?" Chapter 4 of "Spatial Accuracy Assessment: Land Information Uncertainty in Natural Resources" ISBN 9780429176685, CRC Press (Mar. 1, 2000) 450 pp. (Year: 2000).*

Schmitt, M. F. L. et al., "Outlier detection on semantic space for sentiment analysis with convolutional neural networks," 2018 Intl. Joint Conf. on Neural Networks (IJCNN) (Jul. 2018) 8 pp. (Year: 2018).*

Qiu, P. et al., "Knowledge embedding with geospatial distance restriction for geographic knowledge graph completion," Intl. Journal of Geo-Information (May 30, 2019) 23 pp. (Year: 2019).*

Piscopo, A. et al., "What we talk about when we talk about wikidata quality: a literature survey," OpenSym '19: Proc. of the 15th Intl. Symp. on Open Collaboration (Aug. 2019) 11 pp. (Year: 2019).*

Omri Koshorek et al., "Text Segmentation as a Supervised Learning Task", Proceedings of the 2018 Conference of the North American Chapter of the Association for Computational Linguistics: Human Language Technologies, vol. 2 (Short Papers), Jun. 2018, 5 pages.

\* cited by examiner

| Text-Data | Semantic Porosity | ML Model | Performance Metrics | Impact |
|---|---|---|---|---|
| Text-Corpus 1 | $a_1$ | $ml_1$ | $f_1$ | $c_1$ |
| ... | ... | ... | ... | ... |
| Text-Corpus N | $a_N$ | $ml_N$ | $f_N$ | $c_N$ |

```
┌─────────────────────────────────────────────────────────────┐
│  GENERATE, BY AT LEAST ONE HARDWARE PROCESSOR, A SEMANTIC   │
│          NETWORK FOR A CORPUS OF TEXT ELEMENTS              │
│                            1102                             │
└─────────────────────────────────────────────────────────────┘
                              │
                              ▼
┌─────────────────────────────────────────────────────────────┐
│        IDENTIFY SEMANTIC HOLES IN THE SEMANTIC NETWORK      │
│                            1104                             │
└─────────────────────────────────────────────────────────────┘
                              │
                              ▼
┌─────────────────────────────────────────────────────────────┐
│                    FILL THE SEMANTIC HOLES                  │
│                            1106                             │
└─────────────────────────────────────────────────────────────┘
                              │
                              ▼
┌─────────────────────────────────────────────────────────────┐
│ DETERMINE A PERFORMANCE IMPACT BETWEEN UTILIZATION OF THE   │
│  CORPUS TO GENERATE AN APPLICATION BY USING THE TEXT        │
│  ELEMENTS WITHOUT FILLING THE SEMANTIC HOLES AND THE TEXT   │
│       ELEMENTS WITH THE SEMANTIC HOLES FILLED               │
│                            1108                             │
└─────────────────────────────────────────────────────────────┘
```

*FIG. 11*

MACHINE LEARNING BASED SEMANTIC STRUCTURAL HOLE IDENTIFICATION

BACKGROUND

For data that is used with an application or to design an application, quality of the data may respectively affect the operation or the design of the application. In this regard, a variety of techniques may be used to analyze completeness of the data. For example, techniques may be used to determine whether the data includes missing details such as grammatically incomplete sentences, missing headings, etc.

BRIEF DESCRIPTION OF DRAWINGS

Features of the present disclosure are illustrated by way of example and not limited in the following figure(s), in which like numerals indicate like elements, in which:

FIG. 7 illustrates performance impact determination to illustrate operation of the machine learning based semantic structural hole identification apparatus of FIG. 1 in accordance with an example of the present disclosure;

FIG. 11 illustrates a flowchart of an example method for machine learning based semantic structural hole identification in accordance with an example of the present disclosure.

DETAILED DESCRIPTION

Figure 1:
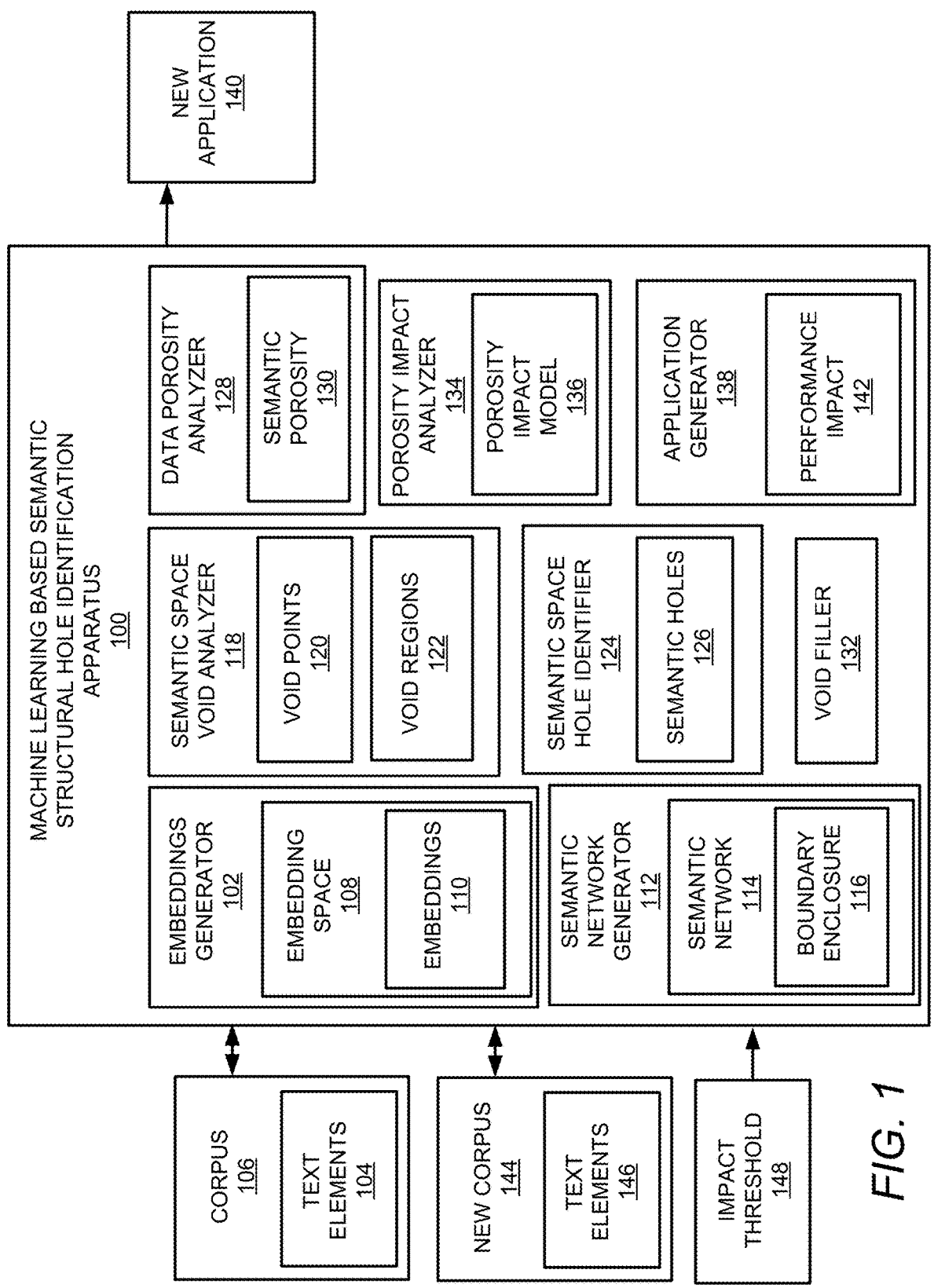
FIG. 1 illustrates a layout of a machine learning based semantic structural hole identification apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Machine learning based semantic structural hole identification apparatuses, methods for machine learning based semantic structural hole identification, and non-transitory computer readable media having stored thereon machine readable instructions to provide machine learning based semantic structural hole identification are disclosed herein. The apparatuses, methods, and non-transitory computer readable media disclosed herein provide for machine learning based semantic structural hole identification by implementing a meta-learning technique to identify semantic holes in a semantic landscape of a data-set, and a potential impact of the identified semantic holes on performance of applications that may be built using the incomplete data-set (e.g., data-set with the semantic holes). The apparatuses, methods, and non-transitory computer readable media disclosed herein may also provide for the continuous refinement of a parameter space during deployment as more data-sets are processed. Thus, the apparatuses, methods, and non-transitory computer readable media disclosed herein may provide for identification of missing semantic patterns in a data-set.

Performance of applications, such as artificial intelligence applications, built using data (e.g., unstructured data such as plain-text) may rely on completeness of the data-sets used for training, testing, validation and during final deployment. In some cases, data-driven artificial intelligence applications may fail unexpectedly if they were built using data-sets with subtle missing semantic patterns. Techniques may be implemented to process data (e.g., unstructured data) to identify incompleteness. In some cases, such techniques may be implemented at a syntactic level at the scale of individual records (e.g., documents) to identify missing fields. In this regard, it is technically challenging to identify incompleteness at the level of subsets of a data-set (e.g., multiple data elements together). It is also technically challenging to identify holes in the semantic landscape of data and to determine probable impact of these holes on the performance of applications that use the data-set.

The apparatuses, methods, and non-transitory computer readable media disclosed herein address at least the aforementioned technical challenges by providing for machine learning based semantic structural hole identification by implementing a meta-learning technique to identify semantic holes in a semantic landscape of a data-set. The apparatuses, methods, and non-transitory computer readable media disclosed herein also address at least the aforementioned technical challenges by identifying a potential impact of the identified semantic holes on performance of applications that may be built using the incomplete data-set (e.g., data-set with the semantic holes).

The apparatuses, methods, and non-transitory computer readable media disclosed herein provide technical benefits such as identification and elimination of semantic holes in data that may be used to generate an application, and/or data that may be used during operation of an application. Further, the apparatuses, methods, and non-transitory computer readable media disclosed herein provide technical benefits such as faster operation of applications that may be generated using data for which semantic holes are minimized (or eliminated), depending on whether a performance impact from using the data for a new application is less than or equal to a specified impact threshold as disclosed herein. In this regard, based on a determination that expected performance impact for the new application is less than the specified impact threshold, as disclosed herein, the new application may be generated using the data with the semantic holes. Alternatively, based on a determination that the expected performance impact for the new application is greater than or equal to the specified impact threshold, the semantic holes may be filled, and the data with the semantic holes filled may be used to generate the new application.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example machine learning based semantic structural hole identification apparatus (hereinafter also referred to as "apparatus 100").

Referring to FIG. 1, the apparatus 100 may include an embeddings generator 102 that is executed by at least one hardware processor (e.g., the hardware processor 1002 of FIG. 10, and/or the hardware processor 1204 of FIG. 12) to map each text element of a plurality of text elements 104 of a corpus 106 into an embedding space 108 that includes a plurality of embeddings 110 that are represented as vectors.

A semantic network generator 112 that is executed by at least one hardware processor (e.g., the hardware processor 1002 of FIG. 10, and/or the hardware processor 1204 of FIG. 12) may generate, based on semantic relatedness between each pair of vectors of the embedding space 108, a semantic network 114. The semantic network generator 112 may determine a boundary enclosure 116 of the embedding space 108. The semantic network generator 112 may generate points to fill the boundary enclosure 116.

According to examples disclosed herein, the semantic network generator 112 may determine a dimensionality of the embedding space 108. For each vector of the embedding space 108, the semantic network generator 112 may determine, based on the dimensionality of the embedding space 108, whether a vector is maximum on at least one dimension, or whether, the vector is least on the at least one dimension.

A semantic space void analyzer 118 that is executed by at least one hardware processor (e.g., the hardware processor 1002 of FIG. 10, and/or the hardware processor 1204 of FIG. 12) may identify, based on an analysis of voidness for each point within the boundary enclosure 116, a set of void points 120. The semantic space void analyzer 118 may identify, based on the set of void points, void regions 122.

According to examples disclosed herein, the semantic space void analyzer 118 may identify, based on the analysis of voidness for each point within the boundary enclosure 116, the set of void points 120 by identifying points within the boundary enclosure 116 for which voidness is less than or equal to a parameter that includes a pre-specified range that determines points that are considered to be isolated.

According to examples disclosed herein, the semantic space void analyzer 118 may identify, based on the set of void points 120, the void regions 122 by iteratively expanding (e.g., for each point in the set of void points 120) a neighborhood of the point in the set of void points 120 to a region by joining neighborhood sets of points that are included as a neighbor.

A semantic space hole identifier 124 that is executed by at least one hardware processor (e.g., the hardware processor 1002 of FIG. 10, and/or the hardware processor 1204 of FIG. 12) may identify semantic holes 126 for each void region.

According to examples disclosed herein, the semantic space hole identifier 124 may identify semantic holes 126 by identifying (e.g., for each void region of the void regions 122) void regions that are surrounded by non-void points. The identified void regions that are surrounded by non-void points may represent semantic gaps. The semantic space hole identifier 124 may identify at least one semantic gap for which a size is less than a specified size of a surrounding non-void region as a semantic hole.

A data porosity analyzer 128 that is executed by at least one hardware processor (e.g., the hardware processor 1002 of FIG. 10, and/or the hardware processor 1204 of FIG. 12) may determine, based on a number of semantic holes 126 in comparison to the text elements 104 of the corpus 106, semantic porosity 130 of the corpus 106.

According to examples disclosed herein, the data porosity analyzer 128 may determine, based on the number of semantic holes 126 in comparison to text elements 104 of the corpus 106, the semantic porosity 130 of the corpus 106 by determining the number of semantic holes 126, and dividing the number of semantic holes 126 by a number of the text elements 104 of the corpus 106.

Avoid filler 132 that is executed by at least one hardware processor (e.g., the hardware processor 1002 of FIG. 10, and/or the hardware processor 1204 of FIG. 12) may fill the semantic holes 126.

A porosity impact analyzer 134 that is executed by at least one hardware processor (e.g., the hardware processor 1002 of FIG. 10, and/or the hardware processor 1204 of FIG. 12) may determine, based on the semantic porosity 130 of the corpus 106, a performance impact between utilization of the corpus 106 to generate an application by using the text elements 104 without filling the semantic holes 126 and the text elements 104 with the semantic holes 126 filled.

According to examples disclosed herein, the data porosity analyzer 128 may generate, based on the performance impact associated with the corpus 106 and performance impacts associated with other corpuses, a regression matrix. Further, the data porosity analyzer 128 may generate, based on the regression matrix, a porosity impact model 136.

An application generator 138 that is executed by at least one hardware processor (e.g., the hardware processor 1002 of FIG. 10, and/or the hardware processor 1204 of FIG. 12) may determine, for a new application 140 that is to be generated and based on application of the porosity impact model 136, a performance impact 142 of utilization of a new corpus 144 to generate the new application 140 by using text elements 146 for the new corpus 144 without filling semantic holes for the new corpus 144.

The application generator 138 may determine whether the performance impact 142 of utilization of the new corpus 144 to generate the new application 140 is greater than or equal to an impact threshold 148 (e.g., if not greater than or equal to, then the performance impact 142 may be determined to be less than). Based on a determination that the performance impact 142 of utilization of the new corpus 144 to generate the new application 140 is less than the impact threshold 148, the application generator 138 may utilize the text elements 146 for the new corpus 144 for generating the new application 140 without filling semantic holes for the new corpus 144.

Alternatively, based on a determination that the performance impact 142 of utilization of the new corpus 144 to generate the new application 140 is greater than or equal to the impact threshold 148, the application generator 138 may fill the semantic holes for the new corpus 144. Once the semantic holes are filled, the application generator 138 may again determine whether the performance impact 142 of utilization of the new corpus 144 with the semantic holes filled is greater than or equal to the impact threshold 148. Based on a determination that the performance impact 142 of utilization of the new corpus 106 with the semantic holes filled is less than the impact threshold 148, the application generator 138 may utilize the text elements for the new corpus 144 with the semantic holes filled for generating the new application 140.

Operation of the apparatus 100 is described in further detail with respect to FIGS. 1-9, and particularly FIGS. 2-9.

Figure 2:
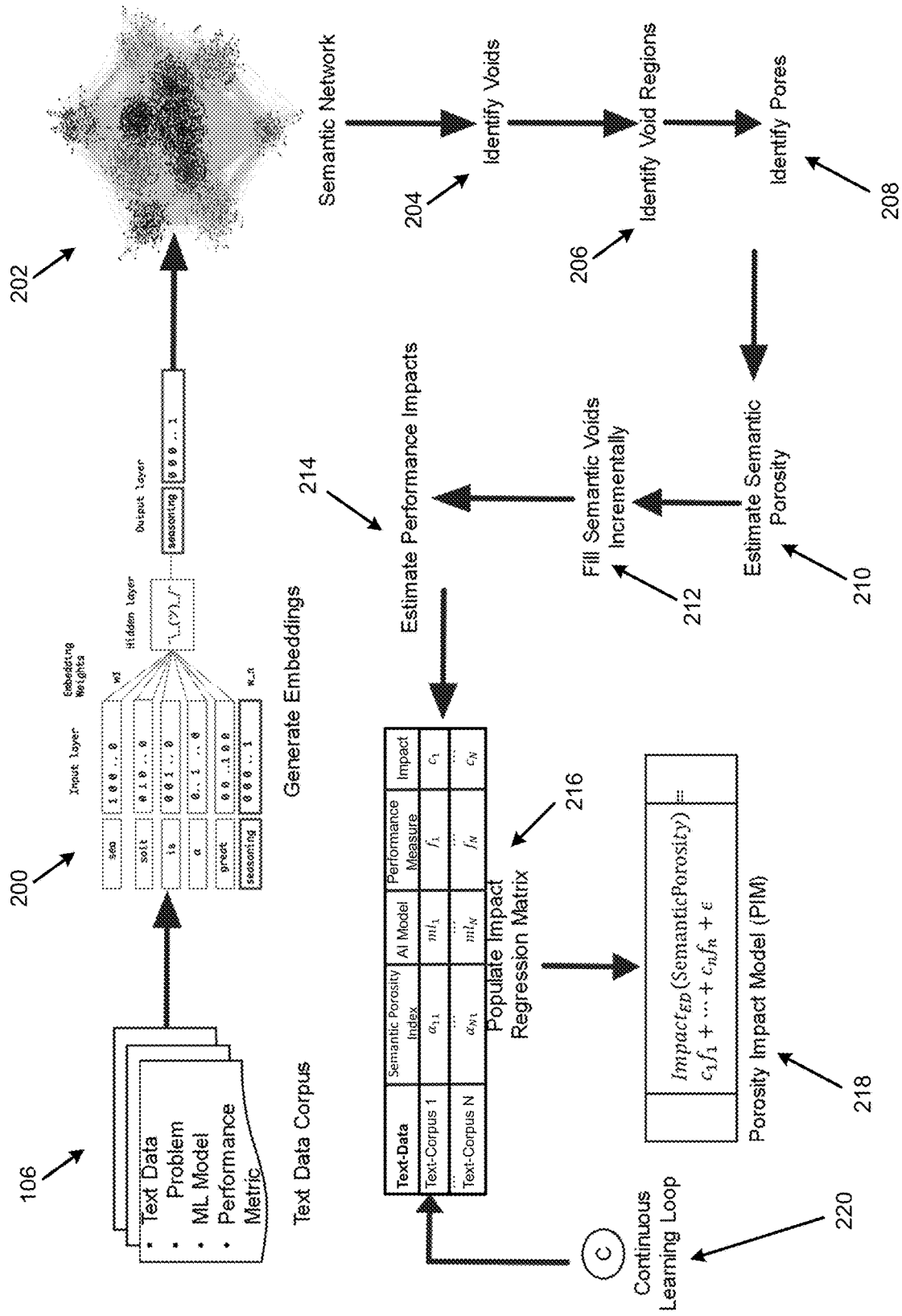
FIG. 2 illustrates a process flow of the machine learning based semantic structural hole identification apparatus of FIG. 1 for building a porosity impact model in accordance with an example of the present disclosure.

FIG. 2 illustrates a process flow of the apparatus 100 for building a porosity impact model 136 in accordance with an example of the present disclosure.

Referring to FIG. 2, at 200, the embeddings generator 102 may map each text element of a plurality of text elements 104 of the corpus 106 into an embedding space 108 that includes a plurality of embeddings 110 that are represented as vectors. In this regard, the corpus 106 may include information such as text data that may be specified as text elements 104, a problem, a machine learning model, and a performance metric. A problem may refer to the technical problem being solved by applying a machine learning technique such that how well does the machine learning model solve the technical problem is estimated using the performance metric. For example, for a technical problem specified as 'email classification', which is being solved by applying a support vector machine (SVM) technique and a F1 measure is used to assess how well the problem may have been solved, the following may be specified:

Problem=Email classification
Machine Learning Model=SVM
Performance Metric=F1.

At 202, the semantic network generator 112 may generate, based on semantic relatedness between each pair of vectors of the embedding space 108, a semantic network 114. The semantic network generator 112 may determine a boundary enclosure 116 of the embedding space 108. The semantic network generator 112 may generate points to fill the boundary enclosure 116.

At 204, the semantic space void analyzer 118 may identify, based on an analysis of voidness for each point within the boundary enclosure 116, a set of void points 120.

At 206, the semantic space void analyzer 118 may identify, based on the set of void points, void regions 122.

At 208, the semantic space hole identifier 124 may identify semantic holes 126 for each void region.

At 210, the data porosity analyzer 128 may determine, based on a number of semantic holes 126 in comparison to the text elements 104 of the corpus 106, semantic porosity 130 of the corpus 106.

At 212, the void filler 132 may fill the semantic holes 126.

At 214, the porosity impact analyzer 134 may determine, based on the semantic porosity 130 of the corpus 106, a performance impact between utilization of the corpus 106 to generate an application by using the text elements 104 without filling the semantic holes 126 and the text elements 104 with the semantic holes 126 filled.

At 216, the data porosity analyzer 128 may generate, based on the performance impact associated with the corpus 106 and performance impacts associated with other corpuses, a regression matrix.

At 218, the data porosity analyzer 128 may generate, based on the regression matrix, a porosity impact model 136.

At 220, further processing may proceed to a continuous learning flow, which is described in further detail with reference to FIG. 9.

Figure 3:
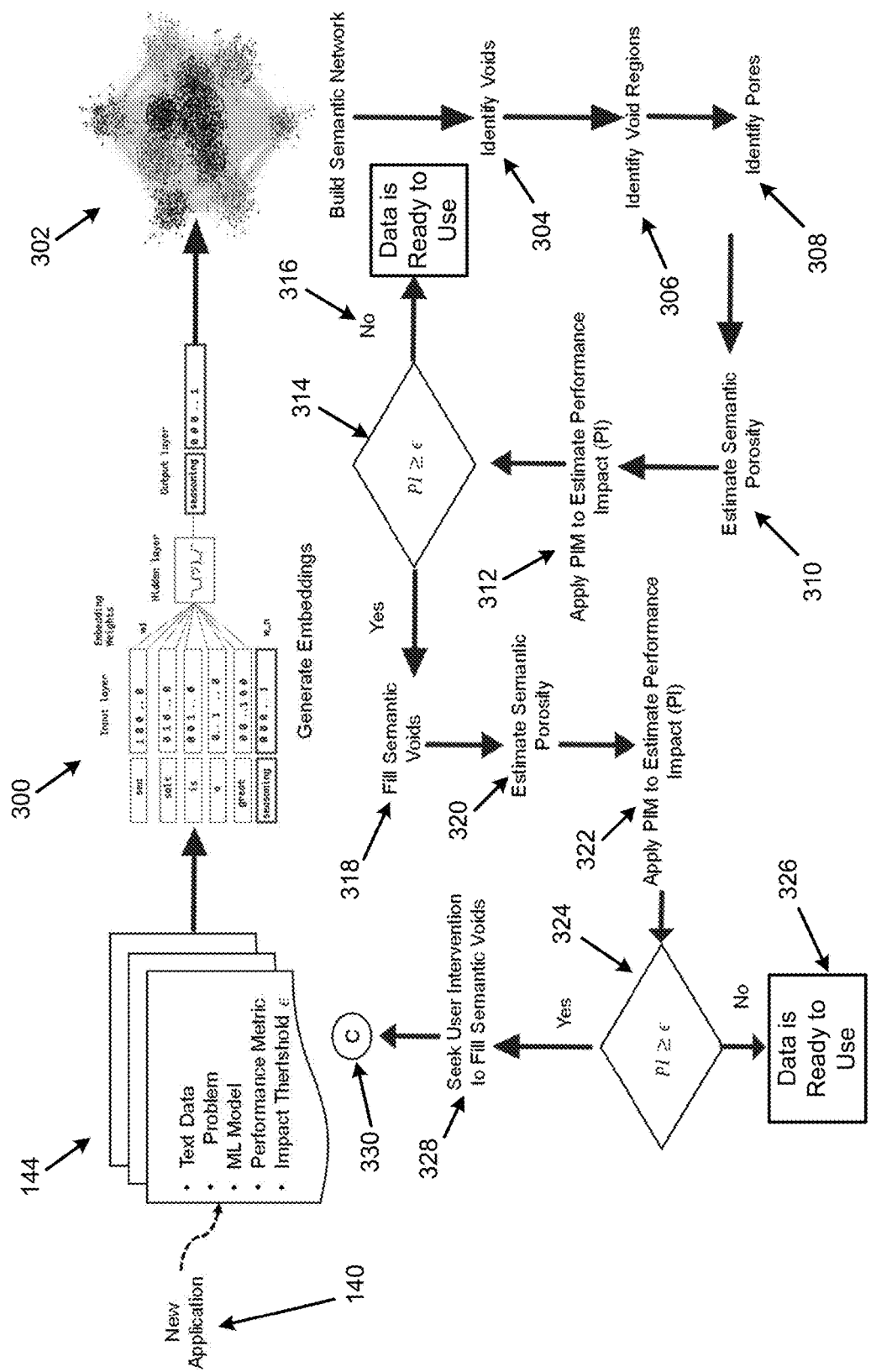
FIG. 3 illustrates a process flow of the machine learning based semantic structural hole identification apparatus of FIG. 1 for applying the porosity impact model of FIG. 2 and for continuous learning in accordance with an example of the present disclosure.

FIG. 3 illustrates a process flow of the apparatus 100 for applying the porosity impact model of FIG. 2 and for continuous learning in accordance with an example of the present disclosure.

Referring to FIG. 3, for a new application 140 that is to be generated, at 300, the embeddings generator 102 may map each text element of a plurality of text elements 146 of the new corpus 144 into an embedding space 108 that includes a plurality of embeddings 110 that are represented as vectors. In this regard, the new corpus 144 may include information such as text data that may be specified as text elements 146, a problem, a machine learning model, a performance metric, and the impact threshold 148.

At 302, the semantic network generator 112 may generate, based on semantic relatedness between each pair of vectors of the embedding space 108, a semantic network 114. The semantic network generator 112 may determine a boundary enclosure 116 of the embedding space 108. The semantic network generator 112 may generate points to fill the boundary enclosure 116.

At 304, the semantic space void analyzer 118 may identify, based on an analysis of voidness for each point within the boundary enclosure 116, a set of void points 120.

At 306, the semantic space void analyzer 118 may identify, based on the set of void points, void regions 122.

At 308, the semantic space hole identifier 124 may identify semantic holes 126 for each void region.

At 310, the data porosity analyzer 128 may determine, based on a number of semantic holes 126 in comparison to the text elements 146 of the new corpus 144, semantic porosity 130 of the new corpus 144.

At 312, the application generator 138 may determine, for the new application 140 that is to be generated and based on application of the porosity impact model 136 (e.g., determined as shown in FIG. 2), the performance impact 142 of utilization of the new corpus 144 to generate the new application 140 by using text elements 146 for the new corpus 144 without filling semantic holes for the new corpus 144.

At 314, the application generator 138 may determine whether the performance impact 142 of utilization of the new corpus 144 to generate the new application 140 is greater than or equal to the impact threshold 148 (e.g., if not greater than or equal to, then the performance impact 142 may be determined to be less than).

At 316, based on a determination that the performance impact 142 of utilization of the new corpus 144 to generate the new application 140 is less than the impact threshold 148, the application generator 138 may utilize the text elements 146 for the new corpus 144 for generating the new application 140 without filling semantic holes for the new corpus 144.

Alternatively, at 318, based on a determination that the performance impact 142 of utilization of the new corpus 144 to generate the new application 140 is greater than or equal to the impact threshold 148, the application generator 138 may fill the semantic holes for the new corpus 144.

Once the semantic holes are filled, after again determining (e.g., at 320) the semantic porosity 130 of the new corpus 144 and application (e.g., at 322) of the porosity impact model 136 to determine the performance impact 142 of utilization of the new corpus 144 to generate the new application 140, at 324, the application generator 138 may again determine whether the performance impact 142 of utilization of the new corpus 144 with the semantic holes filled is greater than or equal to the impact threshold 148.

At 326, based on a determination that the performance impact 142 of utilization of the new corpus 106 with the semantic holes filled is less than the impact threshold 148, the application generator 138 may utilize the text elements for the new corpus 144 with the semantic holes filled for generating the new application 140.

Alternatively, at 328, based on a determination that the performance impact 142 of utilization of the new corpus 106 with the semantic holes filled is still greater than or equal to the impact threshold 148, the application generator 138 may obtain user intervention to fill the semantic holes. Further, once the semantic holes are filled, the application generator 138 may utilize the text elements for the new corpus 144 with the semantic holes filled for generating the new application 140.

At 330, further processing may proceed to a continuous learning flow, which is described in further detail with reference to FIG. 9.

Referring again to FIG. 1, with respect to construction of the semantic network 114, a text analytics problem may include a defined granularity of text at which the text is being analyzed to design a solution for an underlying application. For example, the granularity may include a document level granularity, a paragraph level granularity, a sentence level granularity, a phrase level granularity, or a word level granularity. For the apparatus 100, a unit of text that needs to be analyzed at a time may be referred to as a text element (e.g., the text elements 104 of the corpus 106).

In order to generate the semantic network 114, the embeddings generator 102 may collect a set of text elements in a corpus to be analyzed as follows:

$$\text{Corpus} = \{e_1, e_2, \ldots e_n\} \quad \text{Equation (1)}$$

For Equation (1), e may represent a text element, and n may represent a size of the corpus, where n may vary dynamically based upon the source of the text data. For example, n may be fixed for a static corpus of text data that may have been collected a priori. Alternatively, n may vary dynamically for scenarios where streaming data is to be processed.

The embeddings generator 102 may map each text element of a plurality of text elements 104 of the corpus 106 into the embedding space 108 that includes a plurality of embeddings 110 that are represented as vectors. For example, the embeddings generator 102 may map each of the text elements 104 in the corpus 106 into an embedding space 108 as follows:

$$\text{Embeddings} = \{\bar{v}_1, \bar{v}_2, \ldots \bar{v}_n\} \quad \text{Equation (2)}$$

For Equation (2), $\bar{v}_i$ (vector) may represent an embedding of the text element $e_i$.

Embeddings may be generated at various levels of granularities of the text (e.g., starting at the word level) using techniques such as Word2Vec, Glove, latent semantic analysis (LSA), topic modeling, etc. The embeddings 110 may also be generated using text elements present in the corpus 106, or using text data extracted from global knowledge using sources such as Wikipedia™.

Figure 4:
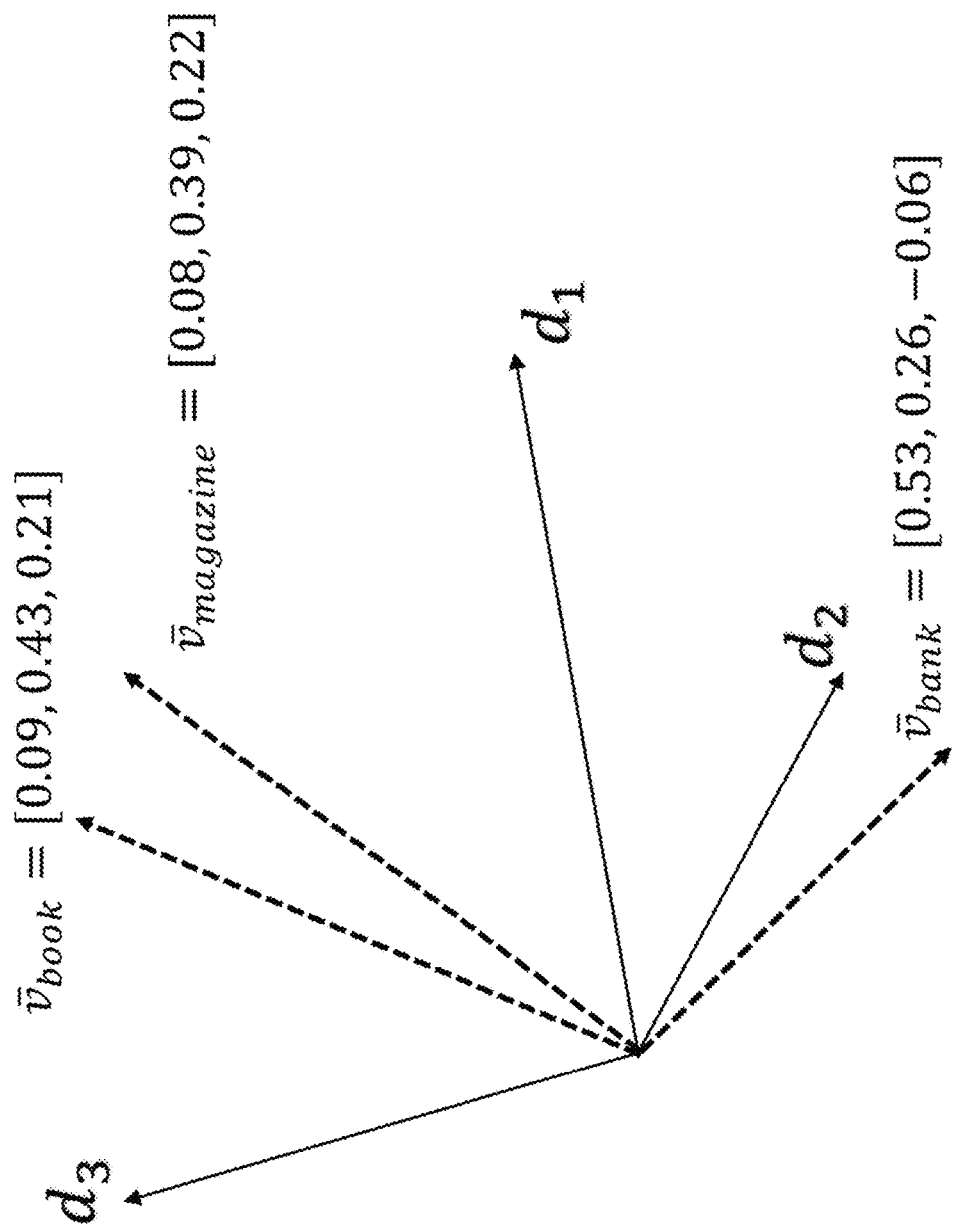
FIG. 4 illustrates construction of a semantic network to illustrate operation of the machine learning based semantic structural hole identification apparatus of FIG. 1 in accordance with an example of the present disclosure.

FIG. 4 illustrates construction of the semantic network 114 to illustrate operation of the apparatus 100 in accordance with an example of the present disclosure.

Referring to FIG. 4, each embedding may represent a point in the multidimensional semantic space, which may be represented as a vector. The vectors illustrated in FIG. 4 may be generated by using various techniques such as Word2Vec, etc., and are provided for illustrative purposes.

Referring again to FIG. 1, the semantic network generator 112 may generate, based on semantic relatedness between each pair of vectors of the embedding space 108, the semantic network 114. For example, the semantic network generator 112 may determine semantic relatedness between each pair of vectors in the embedding space 108 as follows:

$$\text{rel:Embeddings} \times \text{Embeddings} \rightarrow [0,1] \quad \text{Equation (3)}$$

For Equation (3), rel(.,.) may be determined using a text relatedness measure. Examples of unsupervised text relatedness measures may include Cosine, Jaccard, Euclidian, Inner Product, etc. Examples of supervised text relatedness measures may include nonlinear regression methods (e.g., using Siamese Neural Networks, etc.). For FIG. 4, assuming that the embeddings $\bar{v}_{book}$ and $\bar{v}_{magazine}$ are related, this information may be used to generate the semantic network 114 as disclosed herein.

The semantic network generator 112 may determine strength of semantic relationships by determining network strengths of each text element as follows:

$$\text{netstrength:Embeddings} \rightarrow [0,1] \quad \text{Equation (4)}$$

The strength of semantic relationships may be determined as follows:

$$\forall \bar{v}_i \in \text{Embeddings}: netstrength(\bar{v}_i) = \frac{\sum_{\bar{v}_j \neq \bar{v}_i \in Embeddings} rel(\bar{v}_i, \bar{v}_j)}{n} \quad \text{Equation (5)}$$

The strength of semantic relationships may provide a measure of how semantically well-connected a text element is with all other text elements in a corpus. The different shades to illustrate the text elements of FIG. 5 may represent different classes (e.g., closely related groups) of text elements (e.g., C1, C2, C3, and C4). Thus text elements in each of these classes may be semantically well-connected.

The semantic network generator 112 may determine the boundary enclosure 116 of the embedding space 108. In this regard, the semantic network generator 112 may determine a dimensionality of the embedding space 108. For each vector of the embedding space 108, the semantic network generator 112 may determine, based on the dimensionality of the embedding space 108, whether a vector is maximum on at least one dimension, or whether, the vector is least on the at least one dimension. For example, the semantic network generator 112 determine the boundary enclosure (e.g., boundary⊆Embeddings) of the embedding space as follows:

Let k=dimensionality of the Embedding space
boundary={$\bar{v}_i$|(dominates($\bar{v}_i$)==True) OR (dominatedBy($\bar{v}_i$)==True}

$$\text{dominates}(\bar{v}_i) = \begin{cases} \text{True} & \exists r \leq k : \bar{v}_i[r] = \max_{\bar{v}_j \in Embedding} \{\bar{v}_j[r]\} \\ \text{False} & \text{otherwise} \end{cases} \quad \text{Equation (6)}$$

$$\text{dominatedBy}(\bar{v}_i) = \begin{cases} \text{True} & \exists r \leq k : \bar{v}_i[r] = \min_{\bar{v}_j \in Embedding} \{\bar{v}_j[r]\} \\ \text{False} & \text{otherwise} \end{cases} \quad \text{Equation (7)}$$

dominates($\bar{v}_i$) is True if embedding $\bar{v}_i$ is maximum on at least one dimension
dominatedBy($\bar{v}_i$) is True if embedding $\bar{v}_i$ is least on at least one dimension For Equations (6) and (7), r may represent the index of the vectors in the set embeddings. For FIG. 4, $\bar{v}_{bank}$ may dominate on the dimension $d_1$, $\bar{v}_{book}$ may dominate for the dimension $d_2$, and magazine may dominate on the dimension $d_3$. Also, $\bar{v}_{book}$ may be dominated on dimension $d_1$, $\bar{v}_{bank}$ may be dominated on dimensions $d_2$ and $d_3$.

Figure 5:
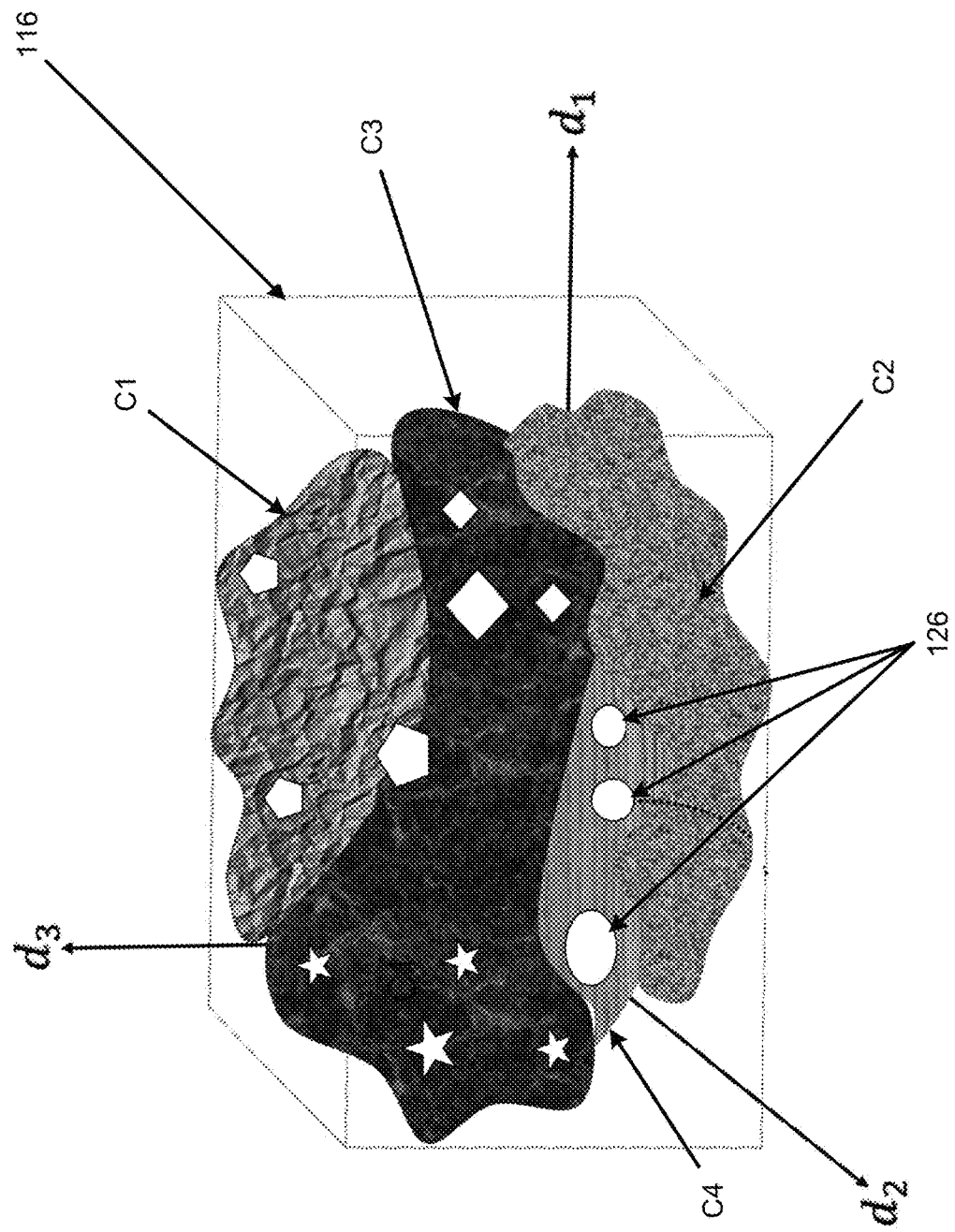
FIG. 5 illustrates a boundary enclosure and identification of holes in a semantic space to illustrate operation of the machine learning based semantic structural hole identification apparatus of FIG. 1 in accordance with an example of the present disclosure.

FIG. 5 illustrates a boundary enclosure and identification of semantic holes in a semantic space to illustrate operation of the apparatus 100 in accordance with an example of the present disclosure.

Referring to FIG. 5, semantic holes 126 and a boundary enclosure 116 are illustrated. It should be noted that the semantic holes 126 shaped as circles, ovals, stars, etc., are provided for illustrative purposes. Actual semantic holes may include various uniform or non-uniform shapes.

Figure 6:
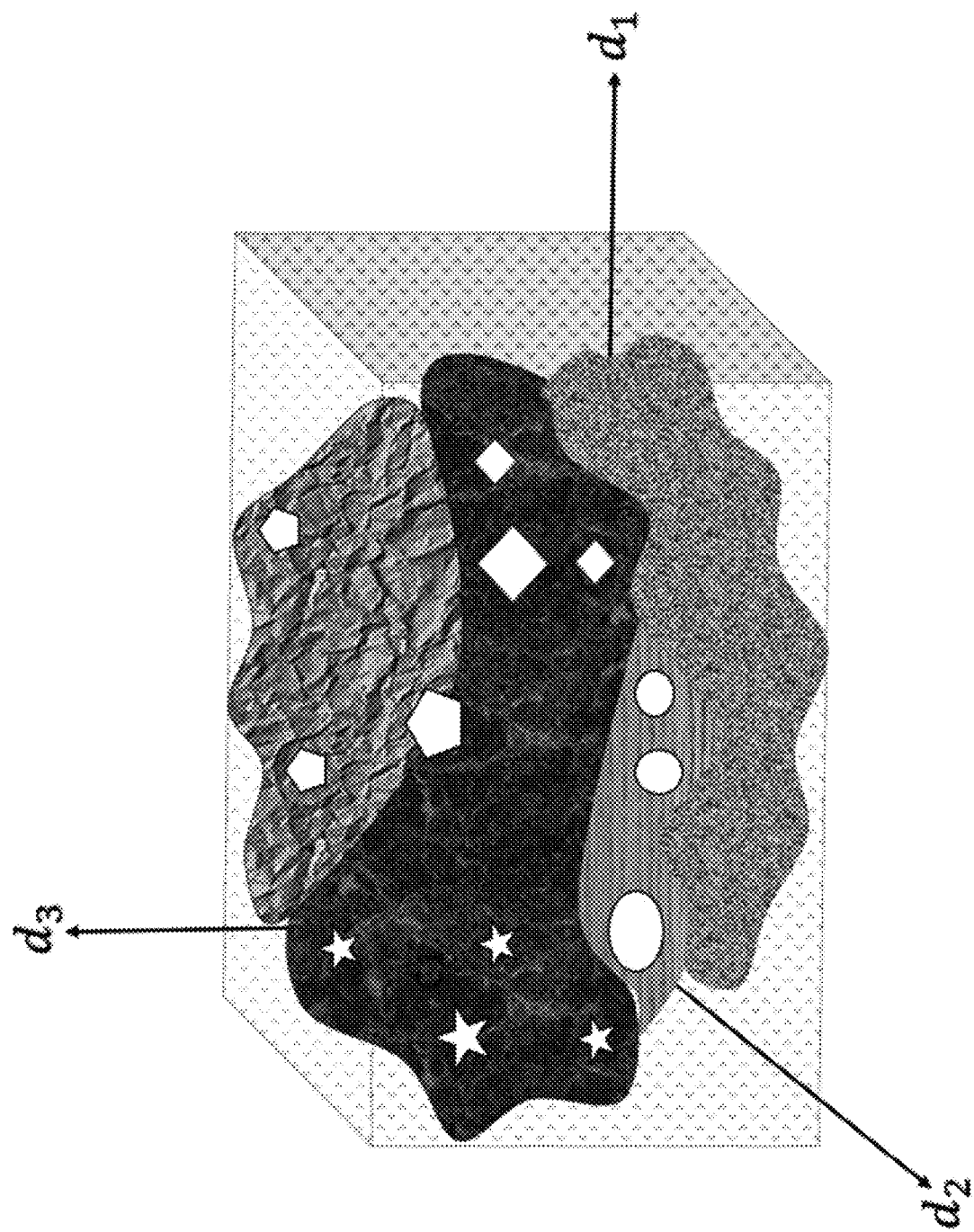
FIG. 6 illustrates implementation of a sweep process to illustrate operation of the machine learning based semantic structural hole identification apparatus of FIG. 1 in accordance with an example of the present disclosure.

FIG. 6 illustrates implementation of a sweep process to illustrate operation of the apparatus 100 in accordance with an example of the present disclosure.

Referring to FIG. 6, the semantic network generator 112 may perform a sweep process to generate all points within the boundary enclosure 116 by looping over all dimensions within the range given by the vectors in the boundary enclosure 116. In this regard, the semantic network generator 112 may specify Δ to be the set that defines the region of the semantic space contained within the boundary.

Referring again to FIG. 1, the semantic space void analyzer 118 may identify, based on an analysis of voidness for each point within the boundary enclosure 116, a set of void points 120. For example, the semantic space void analyzer 118 may determine, for each point x∈ Δ, voidness as follows:

$$\text{voidness}(x) = \begin{cases} \text{netstrength}(x) & \text{if } x \in \text{Embeddings} \\ 0 & \text{otherwise} \end{cases} \quad \text{Equation (8)}$$

In this regard, the semantic space void analyzer 118 may specify $\Delta_{void} \subseteq \Delta$ to be the set of points for which voidness (.)≤θ (where θ is a small parameter in the range of [0, 0.01]), which determines which points are to be considered as isolated. Further, $\Delta_{void}$ may refer to the set of text elements, which either do not exist in the text corpus or are semantically isolated, and their absence may potentially impact performance of the system to be designed using the corpus 106. With respect to an example of utilization of Equation (8) and θ, for a problem of 'email classification' using subject and contents of emails, the email corpus for this problem may include emails written in multiple languages. In this example, each email's subject and content together may be the text elements which will be mapped to an embedding space and be represented as vectors. In this embedding space, those emails which have sentences in more than one language together (e.g., a sentence which uses English words as well as transliteration of Chinese) may be considered. For such emails, their voidness( ) estimation may be a small number since these emails may be relatively less frequent or may have few semantically related emails in their neighborhood. In this example, an application of θ=0.05 may be utilized to identify such e-mails as isolated e-mails.

According to examples disclosed herein, the semantic space void analyzer 118 may identify, based on the set of void points 120, the void regions 122 by iteratively expanding (e.g., for each point in the set of void points 120) a neighborhood of the point in the set of void points 120 to a region by joining neighborhood sets of points that are included as a neighbor. In this regard, for a point z in $\Delta_{void}$, the semantic space void analyzer 118 may collect its neighboring points into its neighborhood set as follows:

$$\text{neighbour}(z) = \{y \in \Delta_{void} | \text{rel}(z, y) \geq \epsilon\} \quad \text{Equation (9)}$$

For Equation (9), ϵ∈[0,1] may represent a threshold of relatedness among neighbors (e.g., default ϵ=0.95).

Next, the semantic space void analyzer 118 may iteratively expand a neighborhood of z to a region by joining neighborhood sets of those points which are currently included in neighbour(z) until the neighborhood cannot expand anymore (e.g., when all neighboring points are either non-void type, such as being semantically well connected, in the set boundary \ $\Delta_{void}$ (the boundary \ $\Delta_{void}$ may represent a set difference operation which means remove all the points from the set boundary which appear in the set $\Delta_{void}$). The semantic space void analyzer 118 may specify Ω(z) to be the largest region of void points around z, which is not included in any other void region. As a result, the semantic space void analyzer 118 may thereby determine a list of unique void regions contained within the boundary of the embedding space, where Θ may represent this list as follows:

$$\Theta = \{\Omega(z_1), \ldots, \Omega(z_k)\} \quad \text{Equation (10)}$$

Referring again to FIGS. 1, 5, and 6, the semantic space hole identifier 124 may define the boundary of each void-region in Θ. Further, the semantic space hole identifier 124 may mark those void regions, which are completely surrounded by non-void points (e.g., for each point in the boundary, its neighborhood set may include at least one non-void point). These marked void regions may represent the semantic gaps in the data-set as follows:

$$\text{Gaps}_{Corpus} \subseteq \Theta \quad \text{Equation (11)}$$

For Equation (11), $\text{Gaps}_{Corpus}$ may represent the semantic gaps.

Referring to FIG. 1, with respect to identification of semantic holes 126 by the semantic space hole identifier 124, not all semantic gaps may be considered as semantic holes since some of the semantic gaps may be legitimate exclusions. In this regard, the semantic space hole identifier 124 may specify a size of the semantic gaps to be a determinant to differentiate different types of semantic gaps. If the size of a semantic gap is less than $\tau \in (0,0.1]$ fraction of the size of the surrounding non-void region, the semantic space hole identifier 124 may treat this as a semantic hole, and otherwise, the semantic gap may not be treated as a semantic hole. Further, the semantic space hole identifier 124 may specify g∈ Gaps$_{Corpus}$ to be a semantic gap, G to be the surrounding non-void region, and where g is a semantic hole in the data if $$\frac{|g|}{|G|} \leq \tau.$$

Further, the semantic space hole identifier 124 may specify H to be the list of all the semantic holes 126 identified in the data using the aforementioned conditions.

With respect to porosity of a data landscape, the data porosity analyzer 128 may determine, based on a number of semantic holes 126 in comparison to the text elements 104 of the corpus 106, semantic porosity 130 of the corpus 106. For example, the data porosity analyzer 128 may determine a degree of semantic porousness as a function of the number of holes in the semantic data landscape in comparison to the availability of the data in the corpus 106 as follows:

$$SemanticPorosity = \frac{\sum_{g \in H} |g|}{|Corpus|} \qquad \text{Equation (11)}$$

With respect to porosity of a data landscape, at the next level of granularity, semantic porosity may also be defined for each class or category (e.g., in case of availability of the labeled data) or clusters (e.g., in case of unlabeled data). In this regard, the data porosity analyzer 128 may specify that $\Gamma = \{C_1, \ldots C_r\}$ to be the list of labelled classes or clusters in the data set of the corpus 106. The data porosity analyzer 128 may determine a per class semantic porosity as follows:

$$\forall\, C_i \in \Gamma\colon\ SemanticPorosity(C_i) = \frac{\sum_{g \in H \downarrow C_i} |g|}{|C_i|} \qquad \text{Equation (12)}$$

For Equation (12), $H \downarrow C_i = \{g \in H$ such that g is surrounded by points in $C_i\}$.

With respect to porosity impact determination, the porosity impact analyzer 134 may self-learn using incremental regression techniques to evolve a model of porousness on performance of the apparatus 100. In this regard, the porosity impact analyzer 134 may measure the difference (denoted impact) of the performances applications built using the raw text-corpus versus filled-text-corpus where the semantic holes 126 have been filled using data imputation or by acquiring additional data. Filling the semantic holes 126 at different levels may yield different performance improvements and hence different data points.

With respect to porosity impact determination, FIG. 7 illustrates performance impact determination to illustrate operation of the apparatus 100 in accordance with an example of the present disclosure.

Referring to FIG. 7, the porosity impact analyzer 134 may generate a regression matrix 700 for estimating the porosity impact model 136 with data points from different degrees of porosities, for different data corpuses, different machine learning models/methods, and different performance metrics. The regression matrix 700 may include the values of $\alpha_1$, $ml_1$, $f_1$, and $c_1$, respectively, for semantic porosity, machine learning model, performance metrics, and impact. For the regression matrix 700, according to an example, Impact (SemanticPorosity, SVM, F1)=0.047*SemanticPorosity+0.0841. In this regard, SemanticPorosity may represent the value from column 2 in FIG. 7, SVM may represent the name of a machine learning method (e.g., column 3 in FIG. 7), and F1 may represent a performance metric (e.g., column 4 in FIG. 7). SVM and F1 may represent inputs (e.g., the new corpus 144), and SemanticPorosity may be determined by performing the steps outlined in Equations (11) and (12).

With respect to learning associated with void filling, the void filler 132 may build an incremental classification model using details from the porosity impact matrix to predict a suitable void filling technique. For example, the void filler 132 may generate porosity impact vectors (PIVs) as follows:

$$PIV_i = \langle \{\bar{v}_{i1}, \bar{v}_{i2}, \ldots \bar{v}_{in}\}, SP_i, MLM_i, PM_i, I_i \rangle \qquad \text{Equation (13)}$$

For Equation (13), $PIV_i$ may represent the porosity impact vector for $i^{th}$ text-data corpus corresponding to the $i^{th}$ application, $\{\bar{v}_{i1}, \bar{v}_{i2}, \ldots \bar{v}_{in}\}$ may represent embeddings for the text elements in the $i^{th}$ text-data corpus, $SP_i$ may represent semantic porosity for the $i^{th}$ text-data corpus, $MLM_i$ may represent the machine learning model for the $i^{th}$ application, $PM_i$ may represent a performance metrics for the $i^{th}$ application, and $I_i$ may represent an impact factor the $i^{th}$ application.

Figure 8:
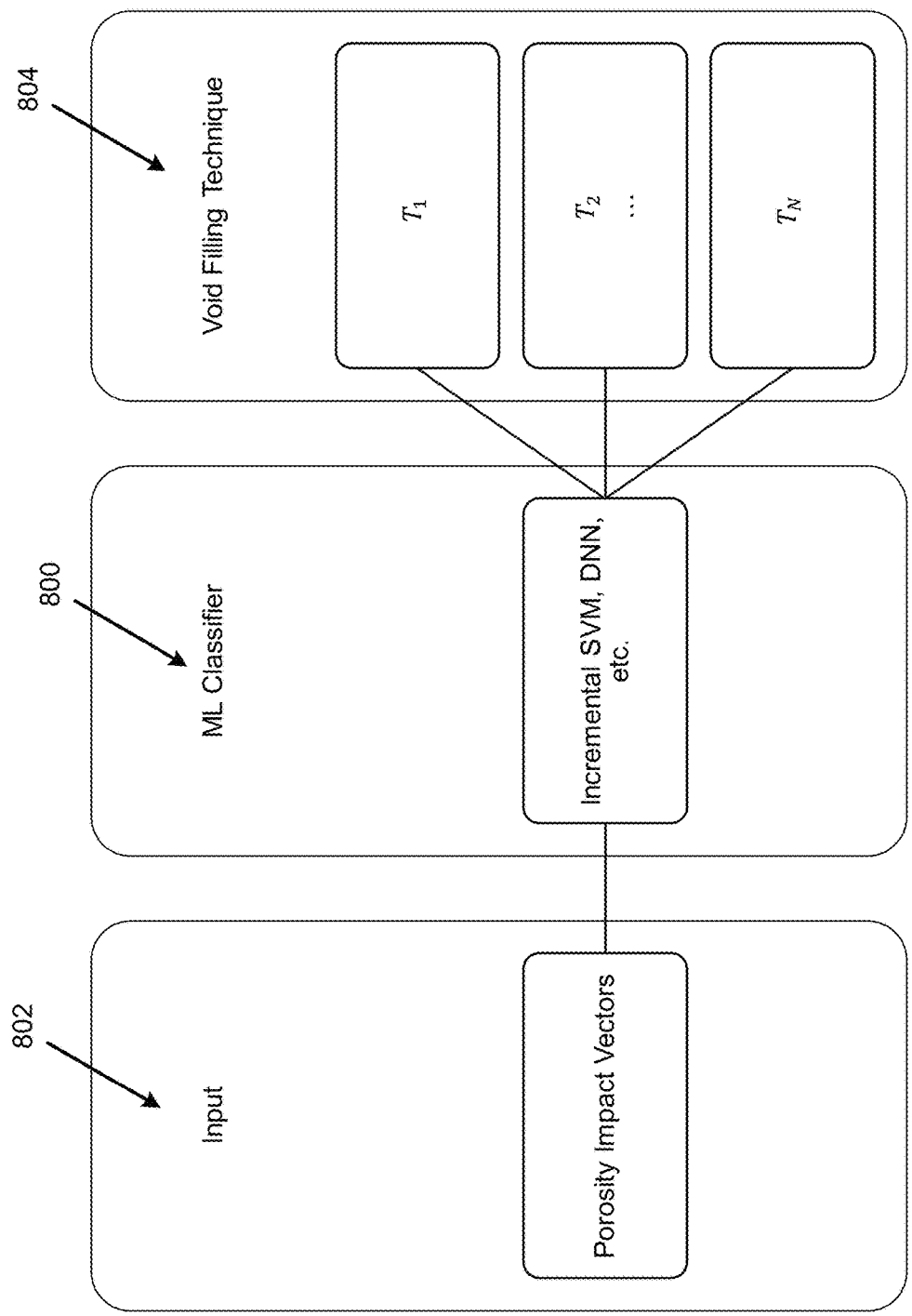
FIG. 8 illustrates learning of a void filling technique to illustrate operation of the machine learning based semantic structural hole identification apparatus of FIG. 1 in accordance with an example of the present disclosure.

FIG. 8 illustrates learning of a void filling technique to illustrate operation of the apparatus 100 in accordance with an example of the present disclosure.

Referring to FIG. 8, as disclosed herein with respect to FIG. 7, the void filler 132 may build an incremental classification model using details from the porosity impact matrix to predict a suitable void filling technique. For example, the incremental classification model is shown at 800. Examples of classification models may include support vector machines (SVM), deep neural networks (DNN), etc. In this regard, based on an input at 802 to the incremental classification model that includes porosity impact vectors, an output at 804 may include a specified void filling technique (e.g., $T_1$, $T_2$, etc.). Examples of void filling techniques may include 'language modelling using n-grams', 'text generation using GPT-2', or 'imputation methods in the case of tabular data'.

An example of application of the porosity impact model 136 to a new application 140 is described with reference to FIGS. 1-3 and 9.

With respect to application of the porosity impact model 136 to a new application 140, a first scenario may include a design problem specification. A second scenario may include testing of a trained machine learning (ML) model or assessing performance of a deployed application. These scenarios may be prevalent in the life cycle of a machine learning based application. The first scenario may pertain to testing of a machine learning model which has been built using the text-data corpus. The second scenario may be utilized when an application based upon the built machine learning model is being used in-practice. With respect to application of the porosity impact model 136 to a new application 140, details of this application may include text-data (to be used for training a machine learning model during testing or deployment). The details may further include the problem specification. The details may include, for the first scenario, a machine learning model to be trained using the text-data, and, for the second scenario, the underlying trained machine learning model. The details may also include the performance metric. The impact threshold ∈ may include a numeric constant in the range of [0,1](default=0.05), and may measure a tolerance level for how much negative impact semantic holes may induce on the performance of the application which will be built using the text-data or which will be given to an existing natural language processing application during deployment.

Figure 9:
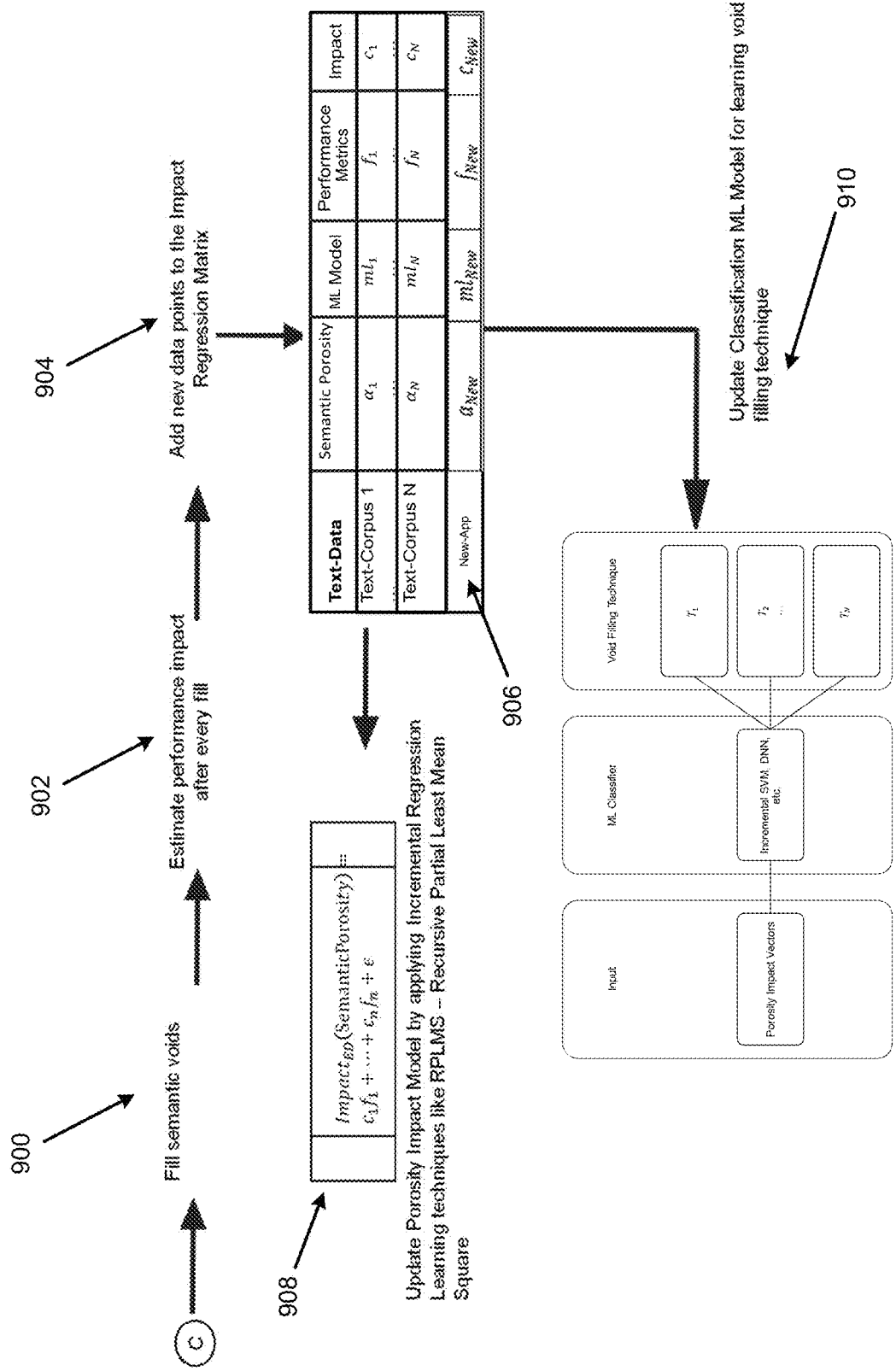
FIG. 9 illustrates a process flow related to continuous learning to illustrate operation of the machine learning based semantic structural hole identification apparatus of FIG. 1 in accordance with an example of the present disclosure.

FIG. 9 illustrates a process flow related to continuous learning to illustrate operation of the apparatus 100 in accordance with an example of the present disclosure.

Referring to FIG. 9, as disclosed herein with respect to FIG. 2, at 216, the data porosity analyzer 128 may generate, based on the performance impact associated with the corpus 106 and performance impacts associated with other corpuses, a regression matrix. At 218, the data porosity analyzer 128 may generate, based on the regression matrix, a porosity impact model 136. Further, at 220, further processing may proceed to a continuous learning flow. Similarly, for FIG. 3, at 330, further processing may proceed to a continuous learning.

With respect to the continuous learning flow, referring to FIGS. 2, 3, and 9, and particularly FIG. 9, at 900 (similar to locations 212 or 318 of FIGS. 2 and 3), semantic voids may be filled.

At 902 (similar to locations 214 or 322 of FIGS. 2 and 3), the porosity impact analyzer 134 may determine, based on the semantic porosity 130 of the corpus 106, a performance impact of utilization of the corpus 106 to generate an application by using the text elements 104 with the semantic holes 126 filled.

At 904 (similar to location 216 of FIG. 2), new data points may be added to the impact regression matrix. For example, as shown at 906, values of the new application 140 for $\alpha_{New}$; $ml_{New}$; $f_{New}$; and $c_{New}$, respectively, may be added for the semantic porosity, machine learning model, performance metric, and impact.

At 908, the data porosity analyzer 128 may update, based on the regression matrix, the porosity impact model 136.

At 910, the void filler 132 may update the incremental classification model using details from the porosity impact matrix to predict a suitable void filling technique.

With respect to generalization to other data types of applications, the semantic space of data-points may be determined. A property which is by default zero may be determined for points not in the data-set, but is non-zero for the points in the data-set in the semantic space. This property may be the number of neighbors under a relationship between the points (e.g., distance metric). The semantic space may be filled by finding if there exists a data point in the data set, and if so, this property may be determined for that data point. A sweep process as disclosed herein may be executed to scan the entire space, identify points with very low values for this property, and then identify a largest region around these points for which density of this property remains relatively low. These regions may represent the void-regions as disclosed herein. For each void-region, a non-void surrounding region encapsulating it may be identified, and if found, this void-region may be considered as semantic hole as disclosed herein.

Figure 10:
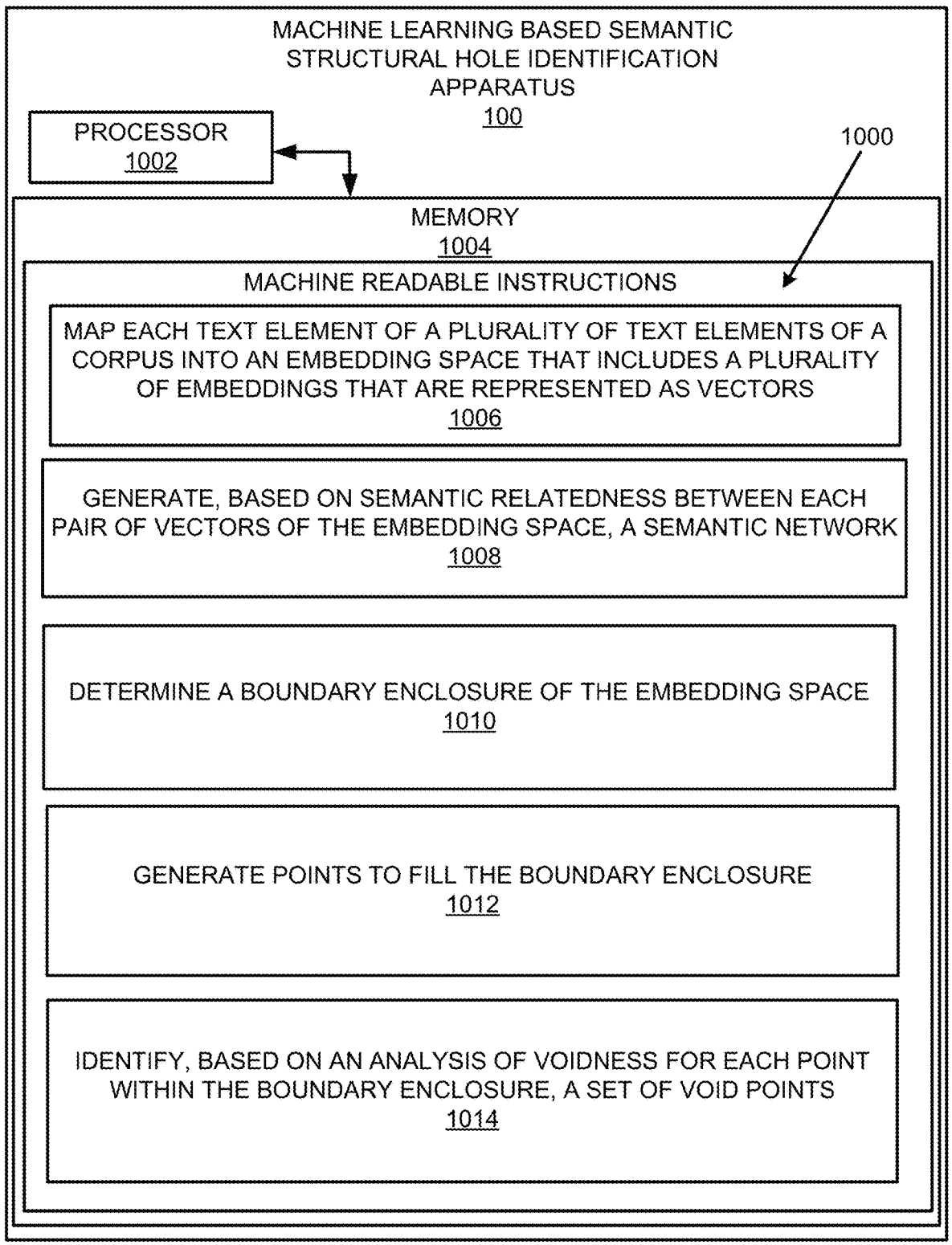
FIG. 10 illustrates an example block diagram for machine learning based semantic structural hole identification in accordance with an example of the present disclosure.
Figure 10:
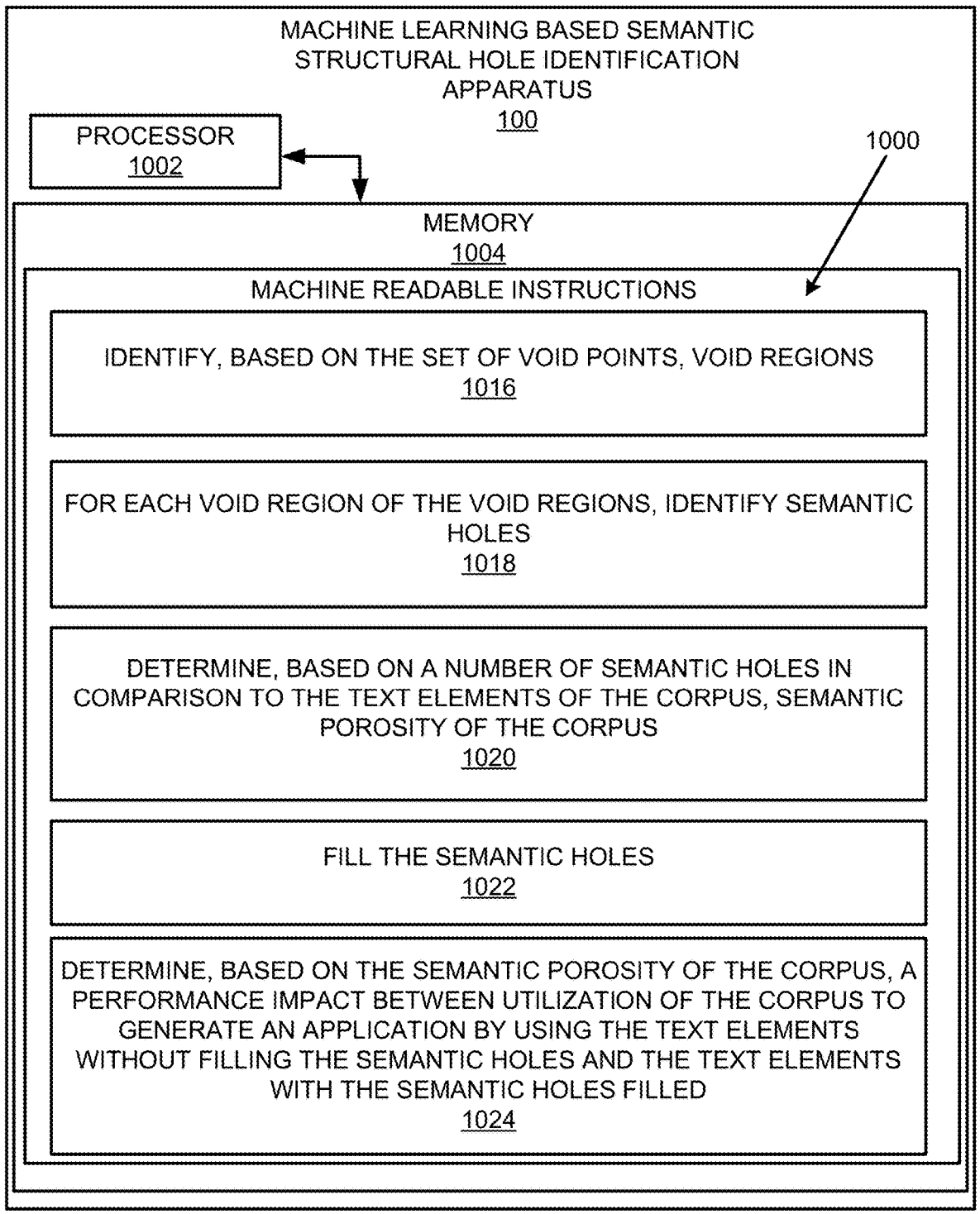
Figure 12:
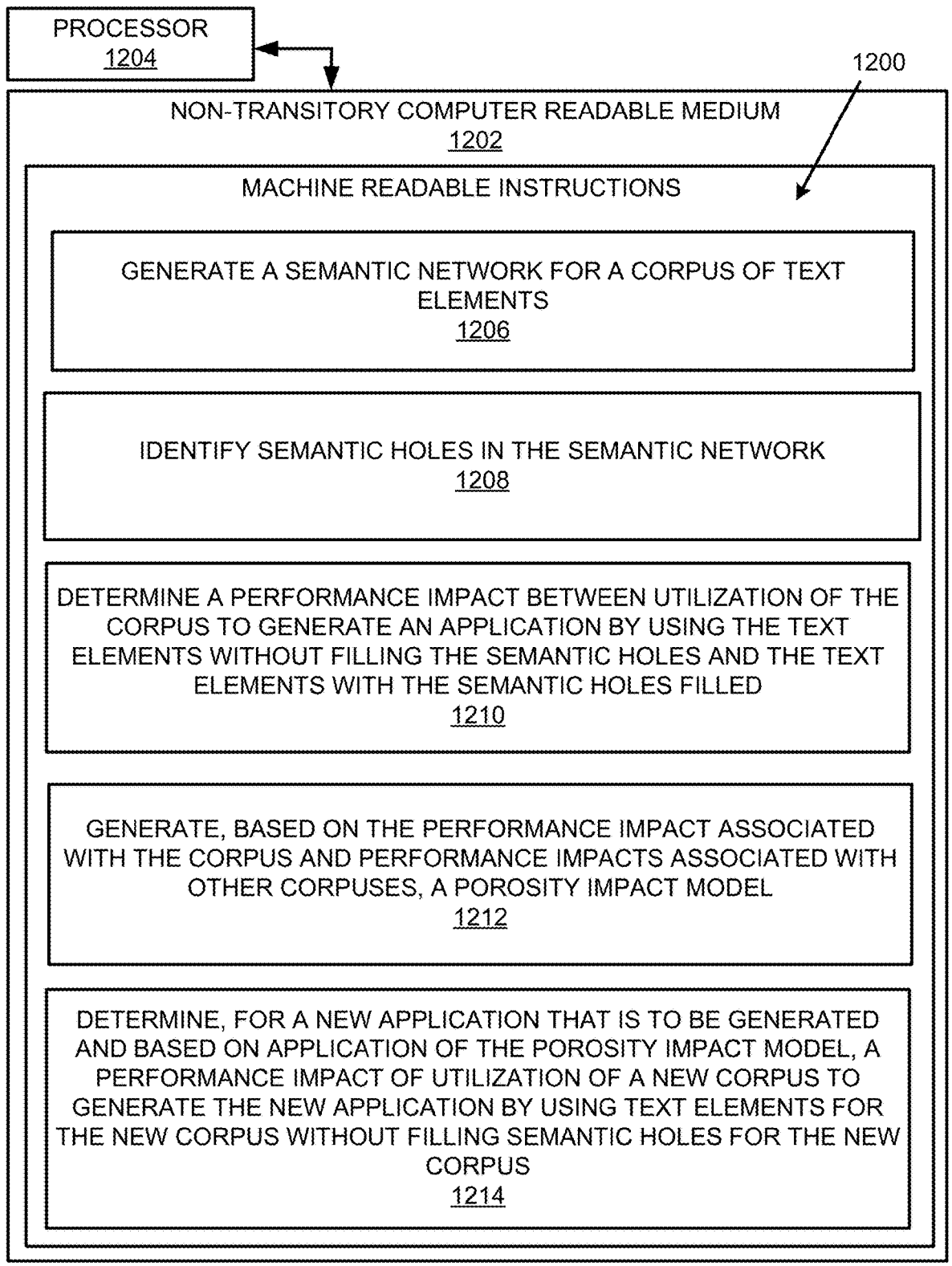
FIG. 12 illustrates a further example block diagram for machine learning based semantic structural hole identification in accordance with another example of the present disclosure.

FIGS. 10-12 respectively illustrate an example block diagram 1000, a flowchart of an example method 1100, and a further example block diagram 1200 for machine learning based semantic structural hole identification, according to examples. The block diagram 1000, the method 1100, and the block diagram 1200 may be implemented on the apparatus 100 described above with reference to FIG. 1 by way of example and not of limitation. The block diagram 1000, the method 1100, and the block diagram 1200 may be practiced in other apparatus. In addition to showing the block diagram 1000, FIG. 10 shows hardware of the apparatus 100 that may execute the instructions of the block diagram 1000. The hardware may include a processor 1002, and a memory 1004 storing machine readable instructions that when executed by the processor cause the processor to perform the instructions of the block diagram 1000. The memory 1004 may represent a non-transitory computer readable medium. FIG. 11 may represent an example method for machine learning based semantic structural hole identification, and the steps of the method. FIG. 12 may represent a non-transitory computer readable medium 1202 having stored thereon machine readable instructions to provide machine learning based semantic structural hole identification according to an example. The machine readable instructions, when executed, cause a processor 1204 to perform the instructions of the block diagram 1200 also shown in FIG. 12.

The processor 1002 of FIG. 10 and/or the processor 1204 of FIG. 12 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1202 of FIG. 12), such as hardware storage devices (e.g., RAM (random access memory), ROM (read only memory), EPROM (erasable, programmable ROM), EEPROM (electrically erasable, programmable ROM), hard drives, and flash memory). The memory 1004 may include a RAM, where the machine readable instructions and data for a processor may reside during runtime.

Referring to FIGS. 1-10, and particularly to the block diagram 1000 shown in FIG. 10, the memory 1004 may include instructions 1006 to map each text element of a plurality of text elements 104 of a corpus 106 into an embedding space 108 that includes a plurality of embeddings 110 that are represented as vectors.

The processor 1002 may fetch, decode, and execute the instructions 1008 to generate, based on semantic relatedness between each pair of vectors of the embedding space 108, a semantic network 114.

The processor 1002 may fetch, decode, and execute the instructions 1010 to determine a boundary enclosure 116 of the embedding space 108.

The processor 1002 may fetch, decode, and execute the instructions 1012 to generate points to fill the boundary enclosure 116.

The processor 1002 may fetch, decode, and execute the instructions 1014 to identify, based on an analysis of voidness for each point within the boundary enclosure 116, a set of void points 120.

The processor 1002 may fetch, decode, and execute the instructions 1016 to identify, based on the set of void points, void regions 122.

The processor 1002 may fetch, decode, and execute the instructions 1018 to identify semantic holes 126 for each void region.

The processor 1002 may fetch, decode, and execute the instructions 1020 to determine, based on a number of semantic holes 126 in comparison to the text elements 104 of the corpus 106, semantic porosity 130 of the corpus 106.

The processor 1002 may fetch, decode, and execute the instructions 1022 to fill the semantic holes 126.

The processor 1002 may fetch, decode, and execute the instructions 1024 to determine, based on the semantic porosity 130 of the corpus 106, a performance impact between utilization of the corpus 106 to generate an application by using the text elements 104 without filling the semantic holes 126 and the text elements 104 with the semantic holes 126 filled.

Referring to FIGS. 1-9 and 11, and particularly FIG. 11, for the method 1100, at block 1102, the method may include generating a semantic network 114 for a corpus 106 of text elements 104.

At block 1104, the method may include identifying semantic holes 126 in the semantic network 114.

At block 1106, the method may include filling the semantic holes 126.

At block 1108, the method may include determining a performance impact between utilization of the corpus 106 to generate an application by using the text elements 104 without filling the semantic holes 126 and the text elements 104 with the semantic holes 126 filled.

According to examples disclosed herein, the method may further include mapping each text element of the text elements 104 of the corpus 106 into an embedding space 108 that includes a plurality of embeddings 110 that are represented as vectors. The method may include determining a boundary enclosure 116 of the embedding space 108 by determining a dimensionality of the embedding space 108. For each vector of the embedding space 108, the method may include determining, based on the dimensionality of the embedding space 108, whether a vector is maximum on at least one dimension, or whether, the vector is least on the at least one dimension.

According to examples disclosed herein, the method may further include identifying, based on an analysis of voidness for each point within the boundary enclosure 116, a set of void points 120 by identifying points within the boundary enclosure 116 for which voidness is less than or equal to a parameter that includes a pre-specified range that determines points that are considered to be isolated.

According to examples disclosed herein, the method may further include identifying, based on the set of void points 120, void regions 122 by iteratively expanding, for each point in the set of void points 120, a neighborhood of the point in the set of void points 120 to a region by joining neighborhood sets of points that are included as a neighbor.

According to examples disclosed herein, the method may further include identifying semantic holes 126 by identifying, for each void region of the void regions 122, void regions that are surrounded by non-void points. The identified void regions that are surrounded by non-void points may represent semantic gaps. The method may include identifying at least one semantic gap for which a size is less than a specified size of a surrounding non-void region as a semantic hole.

According to examples disclosed herein, the method may further include determining, based on a number of semantic holes 126 in comparison to text elements 104 of the corpus 106, a semantic porosity 130 of the corpus 106 by determining the number of semantic holes 126, and dividing the number of semantic holes 126 by a number of the text elements 104 of the corpus 106.

According to examples disclosed herein, the method may further include generating, based on the performance impact associated with the corpus 106 and performance impacts associated with other corpuses, a regression matrix.

According to examples disclosed herein, the method may further include generating, based on the regression matrix, a porosity impact model 136.

Referring to FIGS. 1-9 and 12, and particularly FIG. 12, for the block diagram 1200, the non-transitory computer readable medium 1202 may include instructions 1206 to generate a semantic network 114 for a corpus 106 of text elements 104.

The processor 1204 may fetch, decode, and execute the instructions 1208 to identify semantic holes 126 in the semantic network 114.

The processor 1204 may fetch, decode, and execute the instructions 1210 to determine a performance impact between utilization of the corpus 106 to generate an application by using the text elements 104 without filling the semantic holes 126 and the text elements 104 with the semantic holes 126 filled.

The processor 1204 may fetch, decode, and execute the instructions 1212 to generate, based on the performance impact associated with the corpus 106 and performance impacts associated with other corpuses, a porosity impact model 136.

The processor 1204 may fetch, decode, and execute the instructions 1214 to determine, for a new application 140 that is to be generated and based on application of the porosity impact model 136, a performance impact of utilization of a new corpus 144 to generate the new application by using text elements 146 for the new corpus 144 without filling semantic holes for the new corpus 144.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A machine learning based semantic structural hole identification apparatus comprising:
    at least one hardware processor;
    an embeddings generator, executed by the at least one hardware processor, to map text elements of a corpus into an embedding space that includes a plurality of embeddings that are represented as vectors;
    a semantic network generator, executed by the at least one hardware processor, to generate, based on semantic relatedness between each pair of the vectors of the embedding space, a semantic network;
    a semantic space hole identifier, executed by the at least one hardware processor, to identify semantic holes in the semantic network;
    a data porosity analyzer, executed by the at least one hardware processor, to determine, based on a number of the semantic holes in comparison to the text elements of the corpus, semantic porosity of the corpus;
    a void filler, executed by the at least one hardware processor, to fill the semantic holes;
    a porosity impact analyzer, executed by the at least one hardware processor, to determine, based on the semantic porosity of the corpus, a performance impact of utilization of the corpus to generate an application by using the text elements of the corpus without filling the semantic holes; and
    an application generator, executed by the at least one hardware processor, to determine whether the performance impact of utilization of the corpus to generate the application without filling the semantic holes is greater than or equal to an impact threshold; and based on a determination that the performance impact of utilization of the corpus to generate the application without filling the semantic holes is greater than or equal to the impact threshold, utilize the text elements of the corpus with the semantic holes filled by the void filler to generate the application.

2. The apparatus according to claim 1, wherein the semantic network generator is executed by the at least one hardware processor to further determine a boundary enclosure of the embedding space by:

determining a dimensionality of the embedding space; and for each vector of the embedding space, determining, based on the dimensionality of the embedding space, whether a vector is maximum on at least one dimension, or whether the vector is least on the at least one dimension.

3. The apparatus according to claim 2, further comprising:

a semantic space void analyzer, executed by the at least one hardware processor to identify, based on an analysis of voidness within the boundary enclosure, a set of void points, by identifying points within the boundary enclosure for which voidness is less than or equal to a parameter that includes a pre-specified range that determines points that are considered to be isolated.

4. The apparatus according to claim 3, wherein the semantic space void analyzer is executed by the at least one hardware processor to identify, based on the set of void points, void regions, for each point in the set of void points, iteratively expanding a neighborhood of the point in the set of void points to a region by joining neighborhood sets of points that are included as a neighbor.

5. The apparatus according to claim 4, wherein the semantic space hole identifier is executed by the at least one hardware processor to identify the semantic holes by:

for each void region of the void regions, identifying void regions that are surrounded by non-void points, wherein the identified void regions that are surrounded by non-void points represent semantic gaps; and identifying at least one semantic gap for which a size is less than a specified size of a surrounding non-void region as a semantic hole.

6. The apparatus according to claim 1, wherein the data porosity analyzer is executed by the at least one hardware processor to determine, based on the number of the semantic holes in comparison to the text elements of the corpus, the semantic porosity of the corpus by:

determining the number of the semantic holes; and dividing the number of the semantic holes by a number of the text elements of the corpus.

7. The apparatus according to claim 1, wherein the data porosity analyzer is executed by the at least one hardware processor to:

generate, based on the performance impact associated with the corpus and performance impacts associated with other corpuses, a regression matrix; and generate, based on the regression matrix, a porosity impact model.

8. The apparatus according to claim 7, wherein the application generator, executed by the at least one hardware processor, is to determine, for a new application that is to be generated and based on utilization of the porosity impact model, a performance impact of utilization of a new corpus to generate the new application by using text elements of the new corpus without filling semantic holes of the new corpus.

9. The apparatus according to claim 8, wherein the application generator is executed by the at least one hardware processor to:

determine whether the performance impact of utilization of the new corpus to generate the new application is greater than or equal to the impact threshold; and based on a determination that the performance impact of utilization of the new corpus to generate the new application is less than the impact threshold, utilize the text elements of the new corpus for generating the new application without filling the semantic holes of the new corpus.

10. A computer-implemented method for machine learning based semantic structural hole identification, the method comprising:

generating, by at least one hardware processor, a semantic network from a corpus of text elements;

identifying semantic holes in the semantic network;

based on a number of the semantic holes in comparison to the text elements of the corpus, determining semantic porosity of the corpus;

based on the semantic porosity of the corpus, determining a performance impact of utilization of the corpus to generate an application by using the text elements without filling the semantic holes;

determining whether the performance impact of utilization of the corpus to generate the application without filling the semantic holes is greater than or equal to an impact threshold; and based on a determination that the performance impact of utilization of the corpus to generate the application without filling the semantic holes is greater than or equal to the impact threshold, filling the semantic holes and utilizing the text elements of the corpus with the semantic holes filled to generate the application.

11. The method according to claim 10, further comprising:

mapping each text element of the text elements of the corpus into an embedding space that includes a plurality of embeddings that are represented as vectors; and determining a boundary enclosure of the embedding space by determining a dimensionality of the embedding space, and for each vector of the embedding space, determining, based on the dimensionality of the embedding space, whether a vector is maximum on at least one dimension, or whether the vector is least on the at least one dimension.

12. The method according to claim 10, further comprising:

mapping each text element of the text elements of the corpus into an embedding space that includes a plurality of embeddings that are represented as vectors;

determining a boundary enclosure of the embedding space; and identifying, based on an analysis of voidness for each point within the boundary enclosure, a set of void points by identifying points within the boundary enclosure for which the voidness is less than or equal to a parameter that includes a pre-specified range that determines points that are considered to be isolated.

13. The method according to claim 10, further comprising:

mapping each text element of the text elements of the corpus into an embedding space that includes a plurality of embeddings that are represented as vectors;

determining a boundary enclosure of the embedding space;

identifying, based on an analysis of voidness for each point within the boundary enclosure, a set of void points; and identifying, based on the set of void points, void regions by iteratively expanding, for each point in the set of void points, a neighborhood of the point in the set of void points to a region by joining neighborhood sets of points that are included as a neighbor.

14. The method according to claim 13, wherein identifying the semantic holes in the semantic network comprises:

identifying, for each void region of the void regions, void regions that are surrounded by non-void points, wherein the identified void regions that are surrounded by non-void points represent semantic gaps, and identifying at least one semantic gap for which a size is less than a specified size of a surrounding non-void region as a semantic hole.

15. The method according to claim 10, wherein determining the semantic porosity of the corpus comprises:

determining the number of the semantic holes, and dividing the number of the semantic holes by a number of the text elements of the corpus.

16. The method according to claim 10, further comprising:

generating, based on the performance impact associated with the corpus and performance impacts associated with other corpuses, a regression matrix; and generating, based on the regression matrix, a porosity impact model.

17. A non-transitory computer readable medium having stored thereon machine readable instructions, the machine readable instructions, when executed by at least one hardware processor, cause the at least one hardware processor to:

generate a semantic network for a corpus of text elements;

identify semantic holes in the semantic network;

based on a number of the semantic holes in comparison to the text elements of the corpus, determine semantic porosity of the corpus;

based on the semantic porosity of the corpus, determine a performance impact of utilization of the corpus to generate an application by using the text elements without filling the semantic holes;

determine whether the performance impact of utilization of the corpus to generate the application without filling the semantic holes is greater than or equal to an impact threshold; and based on a determination that the performance impact of utilization of the corpus to generate the application without filling the semantic holes is greater than or equal to the impact threshold, fill the semantic holes and utilize the text elements of the corpus with the semantic holes filled to generate the application.

18. The non-transitory computer readable medium according to claim 17, wherein the machine readable instructions, when executed by the at least one hardware processor, further cause the at least one hardware processor to:

generate, based on the performance impact associated with the corpus and performance impacts associated with other corpuses, a porosity impact model;

determine, based on utilization of the porosity impact model, a performance impact of utilization of a new corpus to generate a new application by using text elements of the new corpus without filling semantic holes of the new corpus;

determine whether the performance impact of utilization of the new corpus to generate the new application is greater than or equal to the impact threshold; and based on a determination that the performance impact of utilization of the new corpus to generate the new application is less than the impact threshold, utilize the text elements of the new corpus for generating the new application without filling the semantic holes of the new corpus.

\* \* \* \* \*